United States Patent
Dukowicz et al.

[11] 3,815,511
[45] June 11, 1974

[54] DC MAGNETIC PROPULSION AND LEVITATION SYSTEM FOR HIGH SPEED VEHICLES

[75] Inventors: John K. Dukowicz, Southfield; Lyle O. Hoppie, Birmingham; Tsih C. Wang, Troy, all of Mich.

[73] Assignee: General Motors Corporation, Detroit, Mich.

[22] Filed: Apr. 26, 1973

[21] Appl. No.: 354,700

[52] U.S. Cl..... 104/148 LM, 104/148 MS, 318/135
[51] Int. Cl. ...................... B61b 13/08, H02k 41/02
[58] Field of Search. 104/148 LM, 148 MS, 148 SS; 318/135; 310/12, 13

[56] References Cited
UNITED STATES PATENTS

| 357,516 | 2/1887 | Atwater | 104/148 LM |
|---|---|---|---|
| 3,407,749 | 10/1968 | Frig | 104/148 LM |
| 3,575,650 | 4/1971 | Fengler | 318/135 |
| 3,740,628 | 6/1973 | Inagaki et al. | 318/135 |

Primary Examiner—M. Henson Wood, Jr.
Assistant Examiner—George H. Libman
Attorney, Agent, or Firm—Howard N. Conkey

[57] ABSTRACT

A magnetic propulsion and levitation system for a vehicle which is adapted to travel over an established roadbed. The system includes one or more superconducting magnets carried by the vehicle and a plurality of coils embedded in the roadbed in the path of travel of the vehicle. The coils are sequentially energized at a predetermined position relative to the superconducting magnet for establishing levitation and propulsion forces. The energization of the coils is accomplished by SCR switching elements which are switched on in response to a signal radiated from the vehicle and are switched off by the counter EMF induced in the coils when the superconducting magnet leaves the vicinity of the coil.

3 Claims, 4 Drawing Figures

PATENTED JUN 11 1974  3,815,511

DC MAGNETIC PROPULSION AND LEVITATION SYSTEM FOR HIGH SPEED VEHICLES

This invention relates to a magnetic levitation and propulsion system for a vehicle adapted to travel over an established roadbed and, more specifically to such a system including SCR switching elements and the commutation thereof.

It is well known that magnetic or pneumatic forces may be employed to support a body free from physical contact with a surrounding environment. These forms of suspensions have been suggested to obtain frictionless support of a vehicle in order to minimize the required propelling forces to produce vehicle displacement. Known methods of providing propulsion to displace a levitated vehicle include, for example, linear induction motors, linear synchronous motors and reaction jets. As opposed to the aforementioned systems which are combined to provide vehicle levitation and propulsion, the present invention provides for both levitation and propulsion by integral magnetic means.

In the present invention, a roadbed defining the path of travel of a vehicle includes therein a plurality of spaced coils, each of which has associated therewith an SCR switching element which couples the respective coil across a DC power supply when the SCR is gated into conduction. The vehicle includes at least one superconducting magnet positioned for movement over the coils in the roadbed. The SCR associated with a particular coil is gated on when that coil is in proper position relative to the superconducting magnet so as to establish propulsion and levitating forces. The SCR's are turned off to deenergize the coil associated therewith when the superconducting magnet leaves the vicinity of the coil. This completion of the commutation of the SCR's is accomplished by the motion of the magnet over the coils. A counter EMF which exceeds the applied voltage is induced in the coil over which the trailing portion of the superconducting magnet passes and automatically turns off the associated SCR.

The mounting of the superconducting magnet and the profile of its magnetic field may take various forms in order to establish the required propulsion forces.

The invention may be understood by reference to the following description of a preferred embodiment and the drawings in which.

Figure 1:
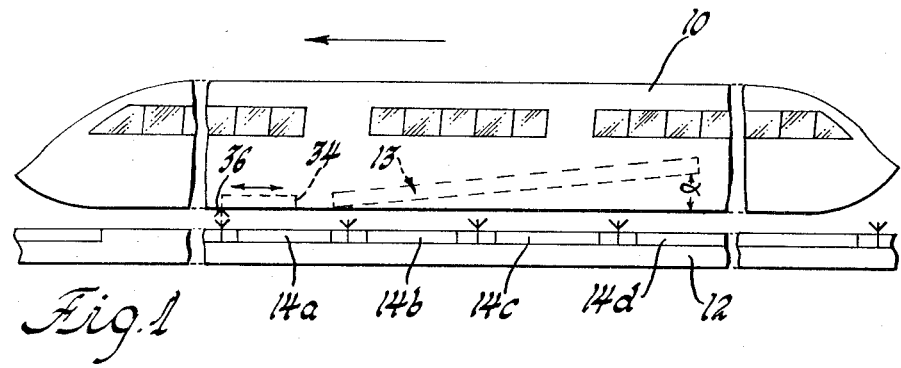
FIG. 1 is a side view of a vehicle illustrating the magnetic levitation and propulsion system embodied by this invention.

Referring to FIG. 1, the embodiment of the invention illustrated is applied to the levitation and propulsion of a vehicle 10 in the direction indicated relative to a roadbed 12 defining a path of travel for the vehicle 10.

The vehicle 10 carries at least one rectangular superconducting magnet 13 which is secured thereto and tilted from the horizontal at an angle $\alpha$ as shown. The roadbed 12 has embedded therein a plurality of spaced coils such as $14_a$, $14_b$, $14_c$, and $14_d$ along the entire length thereof. When these coils are commutated (energized and deenergized) while in proper position relative to the superconducting magnet 13, the magnetic fields of the energized coils and the superconducting magnet cooperate to levitate and propel the vehicle 10 along the roadbed 12. For example, assume the vehicle 10 moving in the direction as shown. If the coils in the roadbed 12, such as the coils $14_a$ through $14_d$, are sequentially energized while the vehicle 10 is moving along the roadbed 12, when the forward edge of the coil is at some distance behind the forward edge of the superconducting magnet 13 and are maintained energized while beneath the surface of the superconducting magnet 13, a force is generated to propel the vehicle along the track as a result of the rate of change of the mutual inductance between the coils and the superconducting magnet 13 due to the tilt of the superconducting magnet 13. The magnitude of this propelling force toward the left in FIG. 1 is essentially equal to the negative of the product of the coil current, the superconducting magnet current and the rate of change in mutual inductance between the coil and the superconducting magnet 13. With the vehicle 10 moving in the direction shown in FIG. 1 and with the superconducting magnet 13 tilted as shown, the rate of change in mutual inductance between the superconducting magnet 13 and the coils, such as the coils $14_a$ through $14_d$, thereunder is negative resulting in a force tending to propel the vehicle 10 in the direction shown. The magnitude of the counter EMF induced in the coils beneath the superconducting magnet 13 as a result of the aforementioned rate of change in mutual inductance is less than the magnitude of the applied voltage B+.

Levitation forces are also generated while the superconducting magnet 13 passes over the energized coils such as the coils $14_a$ through $14_d$.

Figure 2:
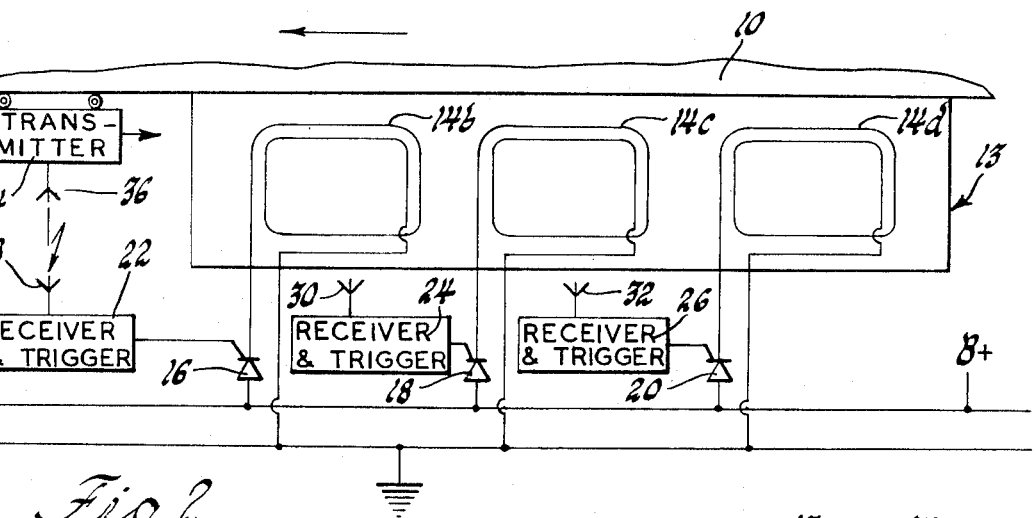
FIG. 2 is a schematic wiring diagram of the electrical control system for controlling the gating on of the SCR's to energize the coils in the roadbed of FIG. 1.

Referring to FIGS. 1 and 2, the control of the energization of the coils such as $14_a$ through $14_d$ in the roadbed 12 will be described. FIG. 2 illustrates only the coils $14_b$, $14_c$ and $14_d$, it being understood that the electrical connections and the control of all of the coils in the roadbed 12 are identical. Also for purposes of illustration, it is assumed that the superconducting magnet 13 spans approximately three of the coils in the roadbed 12, it being understood that other numbers of coils could be spanded by the superconducting magnet 13.

Each of the coils $14_b$, $14_c$ and $14_d$ have one side thereof grounded as shown and the other side thereof coupled to the cathode of a respective SCR 16, 18 and 20. The anodes of the SCR's 16, 18 and 20 are coupled to a voltage source B+ whose negative terminal is grounded. The gate electrode of the SCR 16 is coupled to a receiver and trigger circuit 22, the gate electrode of the SCR 18 is coupled to a receiver and trigger circuit 24 and the gate electrode of the SCR 20 is coupled to a receiver and trigger circuit 26. The receiver and trigger circuits 22, 24 and 26 each has a respective receiving antenna 28, 30 and 32 spaced along the roadbed 12 for detecting a signal radiated thereto. When one of the antennae 28, 30 and 32 receives a radiated signal, the respective receiver and trigger circuit 22, 24 or 26 is responsive thereto for generating a gating signal for gating the respective SCR 16, 18 or 20 into conduction.

A transmitter 34 is carried by the vehicle 10 and includes a radiating antenna 36 for radiating a signal toward the antennae 28, 30 and 32 such that they are sequentially illuminated as the vehicle 10 is displaced along the roadbed 12. The output signal of the antenna 36 is directive such that it impinges on an antenna 28, 30 or 32 when the radiating antenna 36 is opposite thereto. The transmitter 34 and the antenna 36 are movable laterally within the vehicle 10 so that the antenna 28, 30 or 32 associated with the respective coil $14_b$, $14_c$ or $14_d$ is illuminated when the respective coil $14_b$, $14_c$ or $14_d$ is at the desired position relative to the superconducting magnet 13. For example, as seen in FIG. 2, the radiating antenna 36 is opposite the receiving antenna 28 which detects the radiated signal therefrom. The receiver and trigger circuit 22 is responsive thereto for gating the SCR 16 into conduction to energize the coil $14_b$ at a predetermined distance behind the leading edge of the superconducting magnet 13. It is understood that the coils $14_c$ and $14_d$ were previously energized when in the same relative position to the superconducting magnet 13.

As the vehicle 10 moves from left to right over the coils $14_d$, $14_c$ and $14_b$, it can be seen that those coils are sequentially energized as the respective receiving antennae 32, 30 and 28 detect the radiated signal from the radiating antenna 36 to affect the gating of the respective SCR's 20, 18 and 16 into conduction. In the same manner, all of the coils such as the coils $14_a$ through $14_d$ in the roadbed 12 are sequentially energized to levitate and propel the vehicle 10 along the roadbed 12.

A significant feature of this invention is the self-turn off feature inherent in the system described. As the trailing portion of the superconducting magnet 13 passes over one of the coils such as the coils $14_a$ through $14_d$, the rate of change of mutual inductance therebetween increases to induce a counter EMF in the coil which exceeds the applied voltage B+ to reduce the current therethrough to zero to effect turn off of the SCR associated therewith. Therefore, as the vehicle 10 is propelled along the roadbed 12, each of the coils such as $14_a$ through $14_d$ is sequentially energized at the specified position relative to the superconducting magnet 13 to generate levitating and propelling forces and each is sequentially deenergized as the trailing portion of the superconducting magnet 13 passes thereover to thereby complete the commutation of those coils.

The propulsion force applied to the vehicle 10 can be altered by the lateral movement of the transmitter 34. For example, if the transmitter 34 is moved forward within the vehicle 10 so that the coils such as the coils $14_a$ through $14_d$ are energized prior to the passing of the leading portion of the superconducting magnet 13 over the leading edge of the coil, the resulting average propulsion force is decreased and consequently the speed of the vehicle 10 is decreased. It will be noted that both the propulsion and levitation forces can be altered by varying the angle of tilt of the superconducting magnet 13, the position of the transmitter 10, or the magnitude of the voltage B+.

Figure 3:
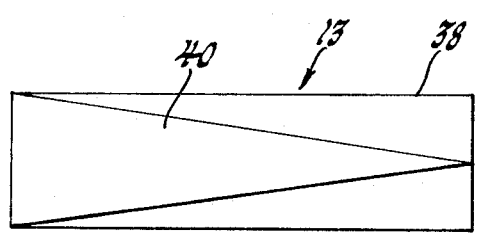
FIG. 3 is a drawing illustrating an alternate configuration of the superconducting magnet for generating propulsion forces.

In the preferred embodiment, the rate of change in mutual inductance between the superconducting magnet 13 and the coils thereunder to generate propulsion forces was obtained by tilting the superconducting magnet 13 to an angle $\alpha$. As seen in FIG. 3, an alternate form of the superconducting magnet 13 is shown for obtaining levitation and propulsion forces. As seen in FIG. 3, the superconducting magnet 13 is viewed from the top and is comprised of a rectangular portion 38 and a tapered portion 40. The rectangular portion 38 functions to provide the levitation forces and SCR turn off as previously described and the tapered portion 40 provides the proper rate of change of mutual inductance which induces a counter EMF in the coils in the roadbed 12 to provide propulsion forces. As can be seen, the embodiment shown in FIG. 3 does not require that the superconducting magnet be tilted as shown in FIG. 1. It is understood that other methods of obtaining the proper rate of change of mutual inductance can be used.

Figure 4:
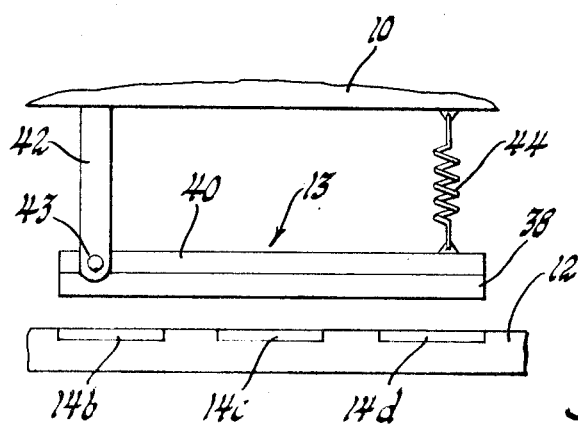
FIG. 4 is a schematic drawing illustrating the mounting of the superconducting magnet illustrated in FIG. 3 in the vehicle of FIG. 1 so as to establish vehicle stabilization.

Referring to FIG. 4, there is shown a combination of the embodiments of FIGS. 1 and 3 to provide for levitation, propulsion and in addition a stabilization of the vehicle 10. As shown in FIG. 4, the superconducting magnet 13 includes the portion 40 and the portion 38. The portion 40 is hinged at one end to a vertical member 42 at a pivot point 43, the member 42 being secured to the vehicle 10. The opposite end of the superconducting magnet 13 is secured to the vehicle 10 through a compression spring member 44. As previously described, the portion 40 of the superconducting magnet 13 generates the propulsion forces necessary to maintain forward movement of the vehicle 10 and the portion 38 provides for levitation of the vehicle 10 and in addition to turn off of the SCR's. If, for some reason, the distance between the vehicle 10 and the roadbed 12 were decreased, a counter EMF would be induced in the coils in the roadbed such as the coils $14_b$, $14_c$ and $14_d$ to decrease the currents therethrough to effect decrease in the levitating forces. The mounting of the superconducting magnet 13 as shown provides against the aforementioned occurrence. If the vehicle 10 is moved downward toward the roadbed 12, the superconducting magnet 13 is rotated about the pivot point 43 against the return force of the spring member 44 to maintain substantially constant counter EMF in the coils. Active means of tilting the magnet 13 may be provided in place of the spring member 44.

Although the preferred embodiment illustrates a vehicle 10 having a single superconducting magnet 13, it is understood that other forms of magnets, such as a permanent magnet or an electromagnet, may be used and further, that a plurality of such magnets may be incorporated within the vehicle 10. In addition, the magnet within the vehicle 10 may be the same length as a single coil as the coils $14_a$ through $14_d$ which may be overlapped. This configuration provides vehicle thrust with a horizontal rectangular magnet. In this latter configuration, greater flux density must be provided at the trailing portion of the magnet to effect SCR turn off.

The above description of a preferred embodiment of the invention is for purposes of illustration only. Many modifications may be made by the exercise of skill in the art without departing from the scope of the invention.

We claim:

1. A magnetic levitation and propulsion system for a vehicle adapted to travel over an established roadbed comprising: a voltage supply; a plurality of coils spaced along the surface of the roadbed; a plurality of SCR switches, each of said SCR switches being coupled in series with a respective coil; means coupling each of the series coupled SCR switches and coils across the voltage supply, each coil being energized by the voltage supply when the SCR switch in series therewith is gated into conduction; a magnet carried by the vehicle over the coils in the roadbed, the magnet and an energized coil thereunder having a rate of change in mutual inductance therebetween as said magnet is moved over said coil to generate a vehicle propulsion force to propel the vehicle along the roadbed and having a greater rate of change when the trailing portion of said magnet passes over an energized coil so as to induce a counter EMF in said coil having a magnitude at least equal to the output of the voltage supply; and means for sequentially gating the SCR switches into conduction as the vehicle is moved over the roadbed when the coils associated therewith are in a prescribed position relative to the magnet to generate a vehicle levitation force and the vehicle propulsion force, the counter EMF induced in each of the energized coils as the trailing portion of the magnet passes thereover reducing the current in said coil to a magnitude to switch the SCR switch in series therewith into nonconduction.

2. A magnetic levitation and propulsion system for a vehicle adapted to travel over an established roadbed comprising: a voltage supply; a plurality of coils spaced along the surface of the roadbed; a plurality of SCR switches, each of said SCR switches being coupled in series with a respective coil; means coupling each of the series coupled SCR switches and coils across the voltage supply, each coil being energized by the voltage supply when the SCR switch in series therewith is gated into conduction; a superconducting magnet carried by the vehicle over the coils in the roadbed, the superconducting magnet spanning a plurality of coils, the superconducting magnet and coils thereunder having a rate of change in mutual inductance therebetween when said coils are energized as said superconducting magnet is moved over said coils to generate a vehicle propulsion force to propel the vehicle along the roadbed and having a greater rate of change when the trailing portion of said superconducting magnet passes over an energized coil so as to induce a counter EMF in said coil having a magnitude at least equal to or greater than the output of the voltage supply; and means for sequentially gating on the SCR switches as the vehicle moves over the roadbed when the coils associated therewith are in a prescribed position behind the leading portion of the superconducting magnet to generate vehicle levitation forces and the vehicle propulsion forces, the counter EMF induced in each of the energized coils as the trailing portion of the superconducting magnet passes thereover reducing the current in said coil to a magnitude to switch the SCR switch in series therewith into nonconduction.

3. A magnetic levitation and propulsion system for a vehicle adapted to travel over an established roadbed comprising: a voltage supply; a plurality of coils spaced along the surface of the roadbed; a plurality of SCR switches, each of said SCR switches being coupled in series with a respective coil; means coupling each of the series coupled SCR switches and coils across the voltage supply, each coil being energized by the voltage supply when the SCR switch in series therewith is gated into conduction; a rectangular magnet carried by the vehicle over the coils in the roadbed, the magnet being tilted from the horizontal at a specified angle so that the magnet and an energized coil thereunder have a rate of change in mutual inductance therebetween as said magnet is moved over said coil to generate a vehicle propulsion force to propel the vehicle along the roadbed; a plurality of receivers spaced along the roadbed, each receiver being coupled to the gate electrode of a respective SCR switch and having a prescribed position relative to the coil series coupled with said respective SCR switch, each receiver being responsive to a transmitted signal to gate the SCR coupled therewith into conduction; and transmitting means carried by the vehicle for radiating a signal toward the receivers, the transmitting means having a position relative to the magnet so as to sequentially illuminate the receivers to gate on the respective SCR switches and energize the coils in series therewith when said coils are in a prescribed position relative to the magnet to generate vehicle levitation forces and the vehicle propulsion forces, the rate of change in mutual inductance as the trailing portion of the magnet moves over an energized coil having a magnitude so as to induce a counter EMF in said coil which is at least equal to the output of the voltage supply to switch the SCR switch in series therewith into nonconduction.

* * * * *